US012619794B2

(12) United States Patent
Vincent

(10) Patent No.: US 12,619,794 B2
(45) Date of Patent: May 5, 2026

(54) SECURITY METHOD AND DEVICE

(71) Applicant: Raytheon Systems Limited, Harlow (GB)

(72) Inventor: Simon Vincent, Bristol (GB)

(73) Assignee: Raytheon Systems Limited, Harlow (GB)

( * ) Notice: Subject to any disclaimer, the term of this patent is extended or adjusted under 35 U.S.C. 154(b) by 25 days.

(21) Appl. No.: 18/421,185

(22) Filed: Jan. 24, 2024

(65) Prior Publication Data

US 2024/0249034 A1 Jul. 25, 2024

(30) Foreign Application Priority Data

Jan. 25, 2023 (GB) ...................................... 2301092

(51) Int. Cl.
*G06F 21/85* (2013.01)
*G06F 21/44* (2013.01)
*G06F 21/84* (2013.01)

(52) U.S. Cl.
CPC .............. *G06F 21/85* (2013.01); *G06F 21/44* (2013.01); *G06F 21/84* (2013.01)

(58) Field of Classification Search
None
See application file for complete search history.

(56) References Cited

U.S. PATENT DOCUMENTS 8,390,842 B2 * 3/2013 Shouno ................... G06F 3/126
358/1.14
8,869,308 B2 10/2014 Soffer 10,958,983 B1 * 3/2021 Soffer .................... G09G 5/006
12,277,086 B2 * 4/2025 Robustelli ........... G06F 13/4282
2004/0198430 A1 * 10/2004 Moriyama ............ G06F 3/1415
455/39
2007/0079252 A1 * 4/2007 Ramnani ................. G06F 9/451
715/781
2007/0203682 A1 * 8/2007 Gummalla ............ G06F 3/1431
703/21
2007/0222779 A1 * 9/2007 Fastert ...................... G06T 1/00
345/418

(Continued)

FOREIGN PATENT DOCUMENTS

CN 113553202 A * 10/2021 ............. G06F 9/546
EP 3651437 A1 5/2020

(Continued)

OTHER PUBLICATIONS

Search Report dated Jul. 28, 2023 in connection with United Kingdom Patent Application No. GB2301092.9, 1 page.

(Continued)

*Primary Examiner* — Michael Pyzocha

(57) ABSTRACT

A security method for a computer, comprising: providing a security device having a communication connection to the computer and a separate communication connection to an external device; and, at the security device: receiving a message having the computer as the intended destination from the external device; verifying the message; and if the message is verified as legitimate, sending a corresponding message to the computer; or if the message is not verified as legitimate, not sending a corresponding message to the computer

18 Claims, 3 Drawing Sheets

(56) References Cited

U.S. PATENT DOCUMENTS

| | | | |
|---|---|---|---|
| 2011/0246756 A1* | 10/2011 | Smith | H04L 9/32 |
| | | | 713/170 |
| 2012/0311207 A1 | 12/2012 | Powers et al. | |
| 2013/0021351 A1* | 1/2013 | Chen | G09G 5/003 |
| | | | 345/522 |
| 2013/0080662 A1* | 3/2013 | Bourque | H04N 21/4367 |
| | | | 710/10 |
| 2015/0365237 A1* | 12/2015 | Soffer | G06F 13/105 |
| | | | 726/20 |
| 2016/0373408 A1* | 12/2016 | Wentworth | G06F 21/606 |
| 2017/0229093 A1* | 8/2017 | Sivertsen | G06F 3/14 |
| 2018/0137310 A1* | 5/2018 | Schenk | G06F 21/71 |
| 2018/0225230 A1* | 8/2018 | Litichever | G06F 21/56 |
| 2020/0226087 A1* | 7/2020 | Sun | H04N 21/442 |
| 2020/0226298 A1 | 7/2020 | Appleboum et al. | |
| 2020/0389469 A1 | 12/2020 | Litichever et al. | |
| 2021/0149441 A1* | 5/2021 | Bartscherer | G06F 1/1616 |
| 2022/0101814 A1* | 3/2022 | Patel | G09G 5/363 |
| 2022/0109680 A1* | 4/2022 | Plaquin | H04L 63/1425 |
| 2023/0351028 A1* | 11/2023 | Ponsini | G06F 21/606 |

FOREIGN PATENT DOCUMENTS

| | | | |
|---|---|---|---|
| EP | 3742324 A1 | 11/2020 | |
| WO | 2013144962 A1 | 10/2013 | |

OTHER PUBLICATIONS

Examination Report dated Jul. 31, 2023 in connection with United Kingdom Patent Application No. GB2301092.9, 3 pages.
Combined Search and Examination Report dated Jul. 31, 2023 in connection with United Kingdom Patent Application No. GB2301092.9, 3 pages.
Vincent et al., "DPFuzzer: A platform independent DisplayPort fuzzer," Raytheon UK presentation, Sep. 2022, 39 pages.
Vincent et al., "DPFuzzer: A platform independent DisplayPort fuzzer," Raytheon UK YouTube presentation with transcript, https://youtu.be/JjaYNTljqjs, Sep. 2022, 14 pages.
European Search Report dated Jun. 3, 2024 in connection with European Patent Application No. 24153137.5, 8 pages.
Examination Report No. 1 dated Nov. 18, 2024 in connection with Australian Patent Application No. 2024200384, 4 pages.
Office Action dated Feb. 14, 2025 in connection with Canadian Patent Application No. 3,227,053, 9 pages.
Examination Report dated Nov. 26, 2025 in connection with United Kingdom Patent Application No. GB2301092.9, 4 pages.
Examiner requisition dated Feb. 18, 2026 in connection with Canadian Patent Application No. 3,227,053, 5 pages.
Microsoft, "Using an INF File to Override EDIDs," Microsoft Learn, Sep. 2022, 5 pages.
Whittaker, "This USB firewall protects against malicious device attacks," ZDNet, Mar. 2017, 7 pages.

* cited by examiner

SECURITY METHOD AND DEVICE

CROSS-REFERENCE TO RELATED APPLICATION AND PRIORITY CLAIM

This application claims priority under 35 U.S.C. § 119(e) to United Kingdom Patent Application No. 2301092.9 filed on Jan. 25, 2023, which is hereby incorporated by reference in its entirety.

FIELD OF THE INVENTION

The present application relates to a security method and device for providing security for a computer, and in particular to a security method and device for providing security for a computer connected to a display device.

BACKGROUND TO THE INVENTION

Computers are commonly connected to external devices, such as peripheral devices, in order to provide desired functionality which cannot be provided by the computer itself. For example, a computer may be connected to peripheral devices such as a visual display device, a keyboard, or the like.

External devices such as computer peripheral devices are commonly able to carry out bidirectional communications with a connected computer. This bidirectional communication is often required in order to enable the computer to identify the capabilities and operational parameters of the external device, so that the computer can send appropriate instructions and data to the external device in operation. However, a problem which can arise is that an external device may use this bidirectional communication to introduce harmful code or data into the computer, either accidentally, or maliciously. For example, malicious actors may place code in an external device which can be used to take control of the computer, or to access the memory of the computer and steal sensitive information, for example by taking advantage of bugs in external device drivers of the computer. In other examples, even without any malicious intent, a faulty external device could send unintended and unanticipated data to a computer through the bidirectional communication link which data can interact with the external device drivers of the computer in a manner harmful to the proper operation of the computer.

The inventors have devised the claimed invention in light of the above considerations. The embodiments described below are not limited to implementations which solve any or all of the disadvantages of the known approaches described above.

SUMMARY OF INVENTION

This Summary is provided to introduce a selection of concepts in a simplified form that are further described below in the Detailed Description. This Summary is not intended to identify key features or essential features of the claimed subject matter; variants and alternative features which facilitate the working of the invention and/or serve to achieve a substantially similar technical effect should be considered as falling into the scope of the invention.

The invention is defined as set out in the appended set of claims.

In a first aspect of the present invention, there is provided a security method for a computer, the method comprising: providing a security device having a communication connection to the computer and a separate communication connection to an external device; and at the security device: receiving a message having the computer as the intended destination from the external device; verifying the message; and if the message is verified as legitimate, sending a corresponding message to the computer; or if the message is not verified as legitimate, not sending a corresponding message to the computer.

This may provide the advantage of preventing messages which are incorrect or comprise malicious code sent from the external device being received by the computer, and so reducing or preventing the risk of accidental or malicious interference in the operation of the computer.

In some embodiments, verifying the message comprises comparing the message to possible messages which the external device may send to the computer.

This may provide the advantage of an efficient and effective way of identifying messages which may be incorrect or comprise malicious code.

In some embodiments, the method further comprises, at the security device: receiving a message having the external device as the intended destination from the computer; and sending a corresponding message to the external device; wherein verifying the message comprises confirming that a message having the external device as the intended destination was received from the computer, so that the message having the computer as the intended destination received from the external device may be a response to the message having the external device as the intended destination received from the computer.

This may provide the advantage of an efficient and effective way of identifying messages which may be incorrect or comprise malicious code.

In some embodiments, the method further comprises; at the security device: receiving a message having the external device as the intended destination from the computer; verifying the message; and if the message is verified as legitimate, sending a corresponding message to the external device; or if the message is not verified as legitimate, not sending a corresponding message to the external device.

This may provide the advantage of preventing messages which are incorrect or comprise malicious code sent from the computer being received by the external device, and so reducing or preventing the risk of accidental or malicious interference in the operation of the external device.

In some embodiments, verifying the message comprises comparing the message to possible messages which the computer may send to the external device.

This may provide the advantage of an efficient and effective way of identifying messages which may be incorrect or comprise malicious code.

In some embodiments, the corresponding message is identical to the received message.

In some embodiments, the corresponding message is modified from the received message.

In some embodiments, the corresponding message is modified such that the external device appears, to the computer, to be an external device having different parameters to the actual parameters of the external device.

This may provide the advantage of allowing the external device drivers used by the computer to be controlled, which may allow the possible attack surface presented by the computer to be reduced.

In some embodiments, the method further comprises, at the security device: sending one or more request for information messages to the external device; receiving one or more response messages from the external device; storing data from the received response messages; and subsequently, receiving a message having the external device as the intended destination from the computer; generating a response message based on the stored data; and sending the response message to the computer.

This may provide the advantage of allowing correct operation of the external device to be verified before enabling communications with the computer.

In some embodiments, the external device is a monitor.

In a second aspect of the present invention, there is provided a security device comprising: a first communications module for connection to a computer; a second communications module for connection to an external device; and a processor; the processor arranged to: when the second communications module receives a message having the computer as the intended destination from the external device, verify the message; and if the message is verified as legitimate, send a corresponding message from the first communications module to the computer; or if the message is not verified as legitimate, not send a corresponding message to the computer.

This may provide the advantage of preventing messages which are incorrect or comprise malicious code sent from the external device being received by the computer, and so reducing or preventing the risk of accidental or malicious interference in the operation of the computer.

In some embodiments, verifying the message comprises comparing the message to possible messages which the external device may send to the computer.

This may provide the advantage of an efficient and effective way of identifying messages which may be incorrect or comprise malicious code.

In some embodiments, the processor is further arranged to: receive a message having the external device as the intended destination from the computer: and send a corresponding message to the external device; wherein verifying the message comprises confirming that a message having the external device as the intended destination was received from the computer, so that the message having the computer as the intended destination received from the external device may be a response to the message having the external device as the intended destination received from the computer.

This may provide the advantage of an efficient and effective way of identifying messages which may be incorrect or comprise malicious code.

In some embodiments, the processor is further arranged to: when the first communications module receives a message having the external device as the intended destination from the computer; verify the message; and if the message is verified as legitimate, send a corresponding message from the second communications module to the external device; or if the message is not verified as legitimate, not send a corresponding message to the external device.

This may provide the advantage of preventing messages which are incorrect or comprise malicious code sent from the computer being received by the external device, and so reducing or preventing the risk of accidental or malicious interference in the operation of the external device.

In some embodiments, verifying the message comprises comparing the message to possible messages which the computer may send to the external device.

This may provide the advantage of an efficient and effective way of identifying messages which may be incorrect or comprise malicious code.

In some embodiments, the corresponding message is identical to the received message.

In some embodiments, the corresponding message is modified from the received message.

In some embodiments, the corresponding message is modified such that the external device appears, to the computer, to be an external device having different parameters to the actual parameters of the external device.

This may provide the advantage of allowing the external device drivers used by the computer to be controlled, which may allow the possible attack surface presented by the computer to be reduced.

In some embodiments, the processor is further arranged to: send one or more request for information messages from the second communications module to the external device; when the second communications module receives one or more response messages from the external device, store data from the received response messages; and subsequently, when the first communications module receives a message having the external device as the intended destination from the computer; generate a response message based on the stored data; and send the response message from the first communications module to the computer.

This may provide the advantage of allowing correct operation of the external device to be verified before enabling communications with the computer.

In some embodiments, a data link carrying a unidirectional flow of data from the computer to the external device is directly physically connected through the security device.

In some embodiments, wherein the security device is not arranged to verify the unidirectional flow of data.

This may provide the advantage of allowing the complexity and cost of the security device to be minimised.

In some embodiments, the security device is connected to the computer and to the external device by DisplayPort compatible connections.

In some embodiments, the first communications module is connected to the computer by an auxiliary channel and the second communications module is connected to the external device by an auxiliary channel; and a main data link directly connects the computer and the auxiliary device.

In some embodiments, the external device is a monitor.

In some embodiments, the security device further comprises a memory device connected to the processor.

In some embodiments, the security device is integrated with the computer.

In a third aspect of the present invention, there is provided a computer-readable medium comprising instructions which, when executed by a processor of a security device, cause the processor to carry out the method of the first aspect.

In some embodiments, if the message is not verified as legitimate, the security device may disconnect the computer from the external device.

In some embodiments, the security device may disconnect communications between the computer and the external device by stopping applying a voltage to a hot plug detection connection of the computer.

The features and embodiments discussed above may be combined as appropriate, as would be apparent to a person skilled in the art, and may be combined with any of the aspects of the invention except where it is expressly provided that such a combination is not possible or the person skilled in the art would understand that such a combination is self-evidently not possible.

BRIEF DESCRIPTION OF THE DRAWINGS

Embodiments of the present invention are described below, by way of example, with reference to the following drawings.

Figure 1:
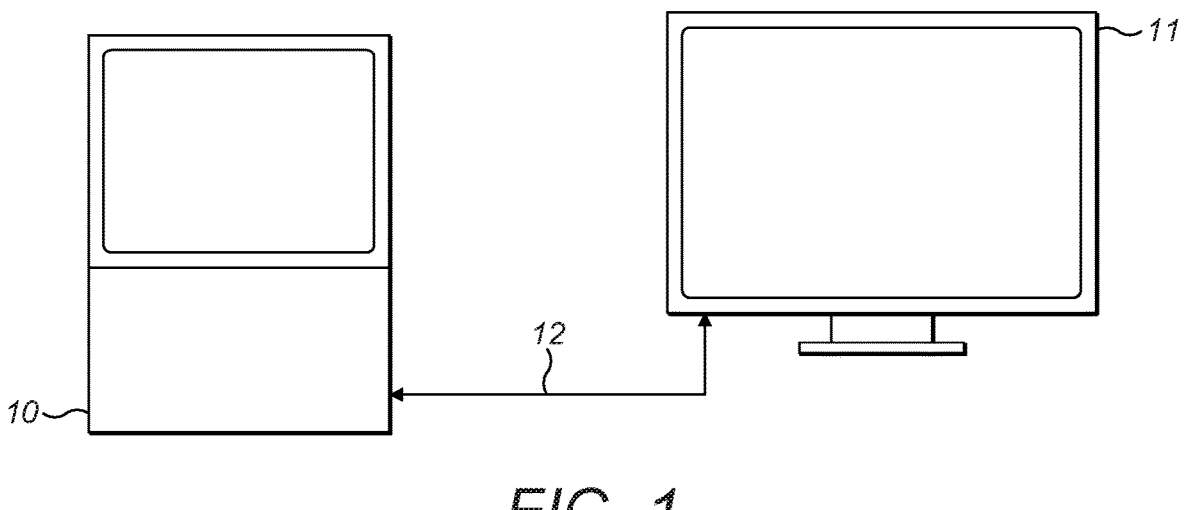
FIG. 1 shows a schematic diagram of an example of a computer connected to an external device.

Common reference numerals are used throughout the figures to indicate the same or similar features.

DETAILED DESCRIPTION

Embodiments of the present invention are described below by way of example only. These examples represent the best mode of putting the invention into practice that are currently known to the Applicant although they are not the only ways in which this could be achieved. the description sets forth the functions of the example and the sequence of steps for constructing and operating the example. However, the same or equivalent functions and sequences may be accomplished by different examples.

FIG. 1 shows a schematic explanatory diagram of a computer 10 connected to an external device 11. The computer 10 is connected to the external device 11 by a bidirectional communication link 12. In operation, the computer 10 sends data to the external device 11 for use through the bidirectional communication link 12, and may also send instructions or commands controlling how the external device 11 uses the data through the bidirectional communication link 12, as necessary. Further, the external device 11 sends information to the computer 10 through the bidirectional communication link 12 identifying functionality of the external device 11, such as required or supported formats for the data sent by the computer 10. The external device 11 may send this information in response to queries sent by the computer 10 through the bidirectional communication link.

There is a problem which can arise that the external device 11 may use the bidirectional communication link 12 to send harmful code or data to the computer 10, either accidentally, or maliciously. For example, a malicious actor could place harmful data such as malicious code in the external device 11 which can be sent to the computer 10 through the bidirectional communication link 12 and used to take control of the computer 10, or to access the memory of the computer 10 to steal and/or change sensitive information. In other examples, even without any malicious intent, the external device 11 could send unintended and/or unanticipated data to the computer 10 through the bidirectional communication link 12, for example due to an malfunction or error in the external device 11, and this data could interact with the computer 10 in an unexpected and/or unintended manner harmful to the proper operation of the computer 10. In some examples, whether the harmful data is sent due to malice or accidentally, the harmful data may be able to interfere with the intended operation of the computer 10 by interacting with bug(s) in an external device driver of the computer 10. In such examples, the risk of harm to the computer or its stored data may be increased because external device drivers commonly have elevated privileges which can be co-opted by harmful data such as malicious code.

Figure 2:
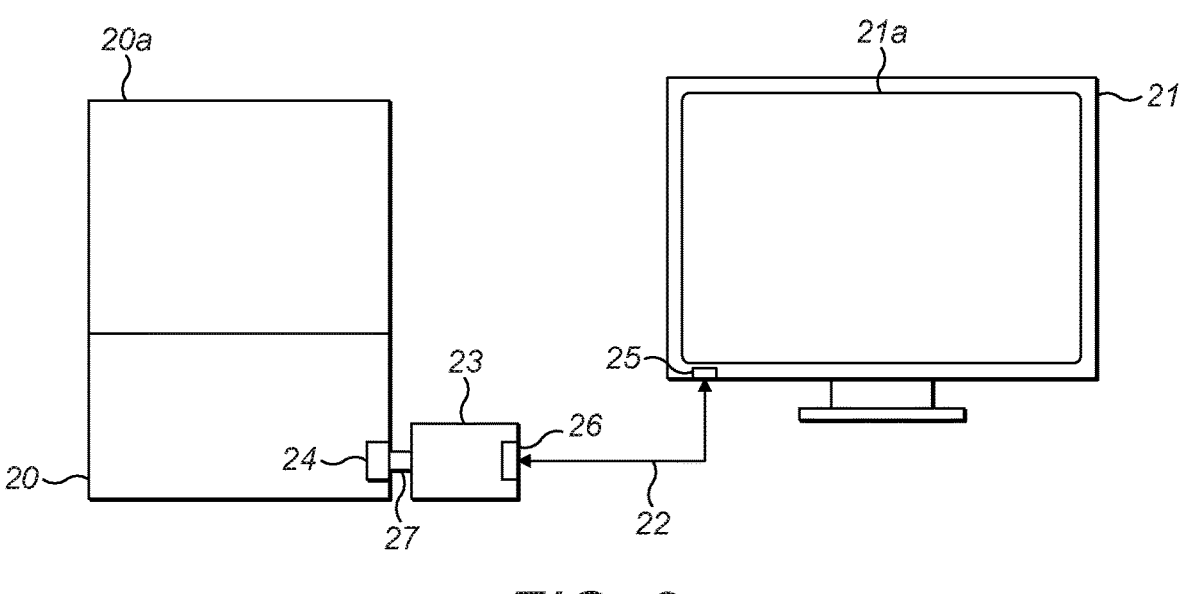
FIG. 2 shows a schematic diagram of a computer connected to an external device using a security device according to an embodiment.

FIG. 2 is a schematic diagram of a computer 20 connected to an external device 21 according to a first embodiment. The external device 21 may be a peripheral device.

As shown in FIG. 2, the computer 20 is a laptop computer 20_a_, and the external device 21 is a visual display device or monitor 21_a_. A security device 23 is attached to the computer 20. The security device 23 is connected to a communications port 24 of the computer 20 to enable bidirectional communication between the computer 20 and the security device 23. A bidirectional communication link 22 is connected between a communications port 25 of the external device 21 and a communications port 26 of the security device 23 to enable bidirectional communication between the external device 21 and the security device 23.

Accordingly, as shown in FIG. 2, bidirectional communication between the computer 20 and the external device 21 is enabled by the bidirectional communication link 22 and the security device 23, with the bidirectional communications passing through and being under the control of the security device 23.

The bidirectional communication link 22 may be a cable physically connecting the communications port 25 of the external device 21 and the communications port 26 of the security device 23. However, this is not essential, and other arrangements providing a bidirectional communication link between the security device 23 and the external device 21 may be used.

In operation of the security device 23, when the computer 20 connected to an operating external device 21, the security device 23 controls communications from the external device 21 to the computer 20. As will be explained in more detail below, the security device 23 may review communications sent from the external device 21 towards the computer 20 and confirm that these communications are legitimate. For example, the security device 23 may analyse the timing of communications sent from the external device 21 to confirm whether the timing corresponds to expected timings of legitimate messages from an external device of the type of the external device 21 to the computer 20, for example whether the communications are responses to queries sent to the external device 21. Alternatively, or additionally, the security device 23 may analyse the data content of communications sent from the external device 21 to confirm whether the format of the data content corresponds to expected formats of legitimate messages from an external device of the type of the external device 21 to the computer 20. In some examples, where the communications are responses to queries sent to the external device 21, the security device 23 may analyse their data content to confirm whether the format of the data content corresponds to expected formats of legitimate responses to the queries. In some examples, the analysed format of the data content of the communications may comprise the size (i.e., number of bits) of the data content. The security device 23 may then selectively send corresponding communications to the computer 20, corresponding to the communications sent from the external device 21 on to the computer 20, or block the communications, based on the results of the analysis. For example, the security device 23 may selectively block communications with timings and/or data content format which does not correspond to those expected for legitimate messages. The corresponding communications may be identical to the communications sent from the external device 21, or may be modified, as is discussed in more detail below. In examples where a corresponding communication is identical to the communication sent from the external device 21, the corresponding communication may be a copy or forwarded version of the communication sent from the external device 21.

It will be understood that malicious code sent to the computer 20, such as malicious code intended to take control of functions of the computer 20, or to extract or corrupt data stored in the computer 20, will generally not have the same timings and/or format as legitimate communications from the external device 21. Further, even in situations where there is no malicious intent, the computer 20 receiving communications in response to queries which have the wrong data content format, such as the wrong size of data content, may cause the computer 20 to react in a manner harmful to the proper operation of the computer 20. For example, if a device driver of the computer 20 sends a query to the external device 21, such as a query regarding the available display parameters where the external device 21 is a monitor, and the computer 20 receives in response a communication having an incorrect data content format which is not an expected or possible format for the response, attempting to process this incorrect data content format may trigger bugs in the operating code of the device driver and cause the device driver to malfunction and interfere with the correct operation of the computer 20. Accordingly, the control of communications from the external device 21 to the computer 20 by the security device 23 may reduce the risk of both malicious and accidental interference in the operation of the computer 20, improving both security and reliability of the computer 20.

Further, in some examples, the security device 23 may also control communications from the computer 20 to the external device 21. For example, the security device 23 may generate communications and send them to the external device 21.

In the illustrated embodiment of FIG. 2 the computer 20 is a laptop computer 20. However, this is by way of example only, and is not essential. The computer 20 may be any type of computer. For example, the computer 20 may be a laptop computer, a desktop computer, a tablet, a smartphone, or the like. This list is by way of example only, and is not intended to be exhaustive.

In the illustrated embodiment of FIG. 2 the external device 21 is a visual display device or monitor 21a. However, this is not essential, and the external device 21 may be any type of external device. For example, the external device 21 may be a monitor, a loudspeaker, an external memory device, a printer, a scanner, a mouse, a keyboard, a webcam, or the like. This list is by way of example only, and is not intended to be exhaustive.

Figure 3:
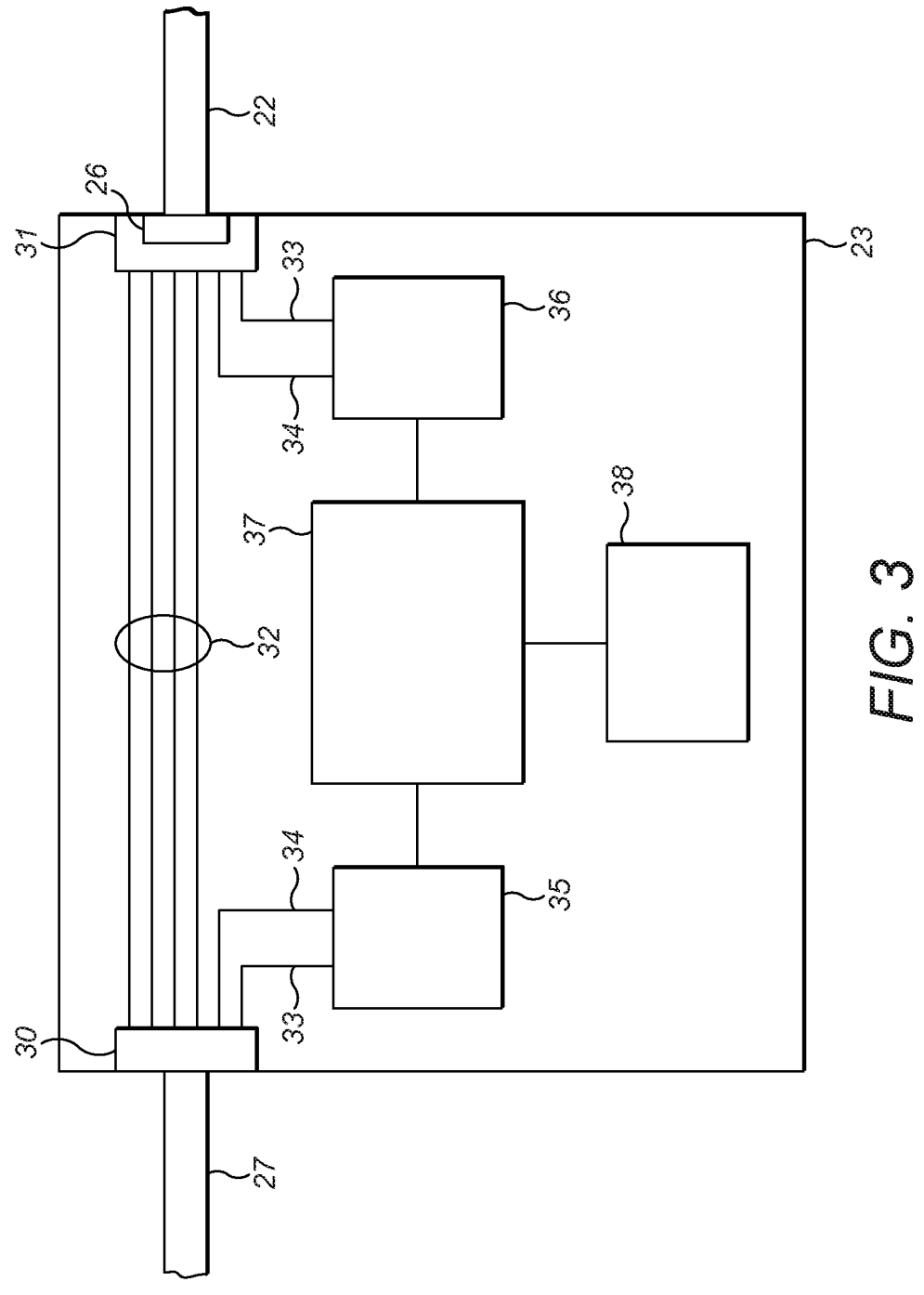
FIG. 3 is a more detailed schematic diagram of a security device useable in the embodiment of FIG. 2.

FIG. 3 is a more detailed schematic diagram of the security device 23 according to the first embodiment. In the embodiment of FIG. 3, where the external device 21 is a monitor 21a, the security device 23 is connected to a communications port 24 of the computer 20 which uses the DisplayPort standard. The DisplayPort standard is a digital display interface standardized by the Video Electronics Standards Association (VESA). The communications port 24 may, for example, be a native DisplayPort communications port, or a USB-C communications port. This list is not intended to be exhaustive, and the security device 23 may be used with other types of communications port 24.

As shown in FIG. 3, the security device 23 comprises a first connector 30 for communication with the computer 20. In the illustrated example of FIGS. 2 and 3 the first connector 30 is physically connected to the communications port 24 of the computer 20 by a cable 27, but this may not be the case in other examples, such as examples where the security device 23 is integrated with the computer 20. Further, the security device 23 comprises a second connector 31 for communication with the monitor 21a. In the illustrated example of FIGS. 2 and 3 the second connector 31 comprises the communications port 26 of the security device 23, which is physically connected to the monitor 21a by the cable 22.

For compatibility with the DisplayPort standard, the first connector 30 and the second connector 31 comprise a main data link 32 formed by four physical data channels, and auxiliary channel 33 formed by a single physical data channel, and a hot plug detection connection 34. Further details of the DisplayPort connectors, such as the precise arrangements of the wires and pins making up the different data channels are well understood by the skilled person, and do not need to be described in detail herein.

As shown in FIG. 3, the main data link 32 is directly connected between the first connector 30 and the second connector 31. Accordingly, the main data link 32 comprises a direct physical connection between the computer 20 and the monitor 21a through the security device 23. The unidirectional flow of data for display from the computer 20 to the monitor 21a along the main data link 32 is not analysed by the security device 23. Since the main data link 32 carries a unidirectional flow of data from the computer 20, the main data link 32 does not provide a possible route for the introduction of harmful code or data into the computer 20, so that there would be no purpose in analysing this data. The data passing along the main data link 32 is typically video and/or audio data. It will be understood that the amount and rate of data passing along the main data link may be very large, so that not analysing this data reduces the data processing demands on the security device 23. This may allow the complexity and cost of the security device 23 to be minimised.

The security device 23 further comprises a first communications module 35 connected to the auxiliary channel 33 and the hot plug detection connection 34 of the first connector 30 and arranged for bidirectional communication with the computer 20, and a second communications module 36 connected to the auxiliary channel 33 and the hot plug detection connection 34 of the second connector 31 and arranged for bidirectional communication with the monitor 21a. Accordingly, the auxiliary channel 33 and the hot plug detection connection 34 are not directly connected between the computer 20 and the monitor 21a, but are only connected through the first and second communications modules 35 and 36 of the security device 23.

The security device 23 further comprises a processor 37 and a connected memory device 38. The processor 37 operates according to program code or software stored in the memory device 38. The processor 37 is connected to the first and second communications modules 35 and 36, and is arranged to process communications received along the auxiliary channel 33 and the hot plug detection connection 34 from the computer 20 and the monitor 21a at the first and second communications modules 35 and 36 respectively, and to instruct the first and second communications modules 35 and 36 to send communications along the auxiliary channel 33 and the hot plug detection connection 34 from the first and second communications modules 35 and 36 to the computer 20 and the monitor 21a respectively.

When an operating, or 'live', monitor 21a is connected to the security device 23, the monitor 21a applies a voltage to the hot plug detection connection 34 of the second connector 31 through the cable 22, and this is reported to the processor 37 of the security device 23 by the second communication module 36. The processor 37 responds to receiving this voltage by determining that an operating external device is connected to the communications port 26 of the security device 23, and uses the first communication module to apply a corresponding voltage to the hot plug detection connection 34 of the first connector 30 to inform the computer 20 that an operating external device is connected the communications port 24 of the computer 20. When the processor 37 has determined that the operating external device 21 is connected to the communications port 26, the security device 23 begins operations to enable safe operation of the external device 21 (in the illustrated example, the monitor 21a) by the computer 20.

The illustrated embodiment of FIG. 3 may allow a secure computer 20 to be connected to an untrusted external monitor or display device 21 without risk of the untrusted external monitor or display device 21 compromising the security of the computer 20. This may be useful, for example, in situations where users are using a secure computer to work remotely, for example in an environment having mixed security classifications, such as a hotel or a shared conference facility.

Figure 4:
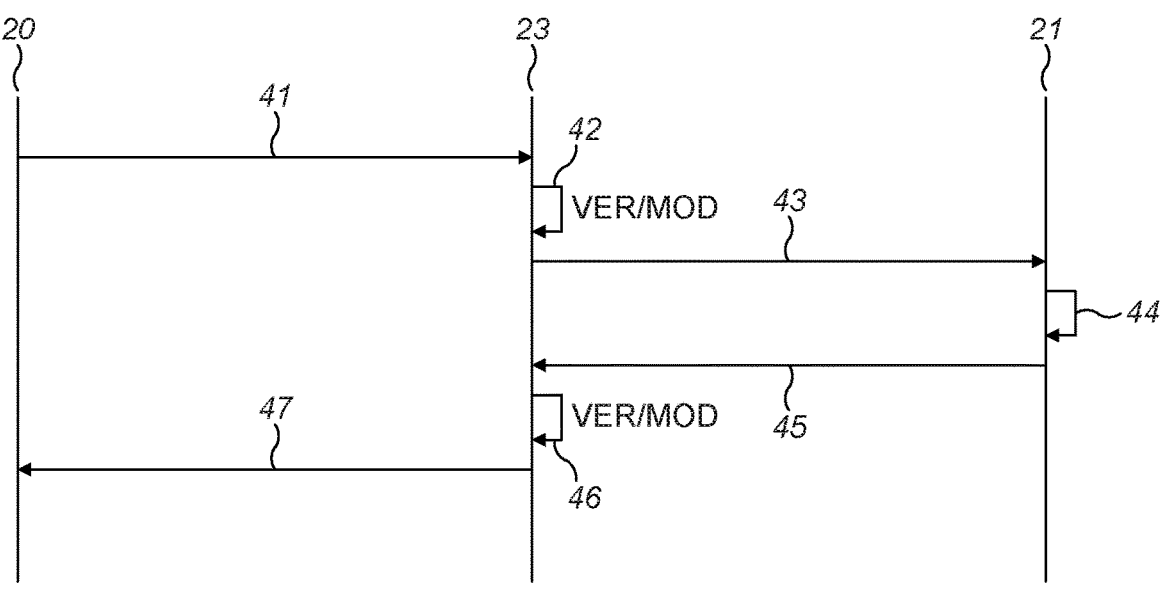
FIG. 4 is a timeline showing a first method of operation of the security device of FIG. 3.

FIG. 4 shows a timeline of a first method 40 of operation of the safety device 23.

As shown in FIG. 4, the first method 40 begins when the computer 20 sends a message 41 along the auxiliary channel 33. The external device 21 (in the illustrated example the monitor 21a) is the intended destination of the message 41. However, the message 41 is received by the security device 23, and is passed by the first communications module 35 to the processor 37. The message 41 may, for example, be a request for the monitor 21a to provide information, or may be an instruction to the monitor 21a to take some action. For example, the message 41 may request information regarding what display modes the monitor 21a can support, or may be an instruction which display mode the monitor 21a is to use.

The processor 37 of the security device 23 verifies 42 that the message 41 is legitimate. In some examples, this may be done by the processor 23 comparing the message 41 to possible messages which the computer 20 may be expected to send to an external device. For example, this may be done by the processor 23 comparing the message 41 to a list of possible messages which the computer 20 may be expected to send to an external device stored in the memory device 38. If the message 41 corresponds to a listed possible message it is verified as legitimate, and if the message 41 does not correspond to a listed possible message it is rejected and not verified as legitimate. The list of possible messages may be a generic list of all possible messages, or may be a list limited to messages which are appropriate to the particular type and/or model of external device and the current situation, taking into account of previous communications between the computer 20 and the monitor 21a, to any desired degree of detail and complexity. The comparison between the message 41 and the list of possible messages may be to any desired level of detail, as appropriate to a specific implementation. For example, it may just be confirmed that the size and/or format of the message 41 corresponds to a size and/or format of a possible message, or it may be confirmed that the message 41 is identical to a possible message. Other methods of verifying messages may also or alternatively be used.

If the message 41 is verified, the processor 37 of the security device 23 uses the second communications module 36 to forward a verified message 43 to the monitor 21a along the auxiliary channel 33. In a first example of the method of FIG. 4 the verified message 43 is the same as the message 41.

Alternatively, if the message 41 is not verified, no corresponding message is sent to the monitor 21a. Further, the security device 23 may issue a warning or alarm that the computer 20 is not operating correctly. It will be understood that the computer 20 attempting to send incorrect or inappropriate messages to an external device may be an indication that the computer 20 is malfunctioning, or that control of the computer 20 has been subverted, so that such a warning may allow the computer 20 to be shut down or investigated, in order to limit any negative effects of the malfunction or subversion.

When the monitor 21a receives the verified message 43, the monitor 21a processes 44 the verified message 43, and sends a response message 45 along the auxiliary channel 33. For example, if the message 41 was a request for the monitor 21a to provide information the response message 45 may be the requested information, or if the message 41 was an instruction to the monitor 21a to take some action, the response message 45 may be confirmation that the action has been taken. The computer 20 is the intended destination of the response message 45. However, the response message 45 is received by the security device 23, and is passed by the second communications module 36 to the processor 37.

The processor 37 of the security device 23 verifies 46 that the response message 45 is legitimate. Similarly to the verification of the message 41, in some examples, this may be done by the processor 23 comparing the response message 45 to possible messages which the computer 20 may be expected to receive from the monitor 21a in response to the verified message 43. Further, the processor 37 may verify that the response message 45 is legitimate by confirming that the response message 45 has actually been received in response to a verified message 41, that is, that a verified message 41 has previously been sent by the security device 23 which the response message 45 may be a response to, and that the response message 45 has not been spontaneously sent by the monitor 21a.

If the response message 45 is verified, the processor 37 uses the first communications module 35 to forward a verified response message 47 to the computer 20 along the auxiliary channel 33. In a first example of the method of FIG. 4 the verified response message 47 is the same as the response message 45.

Alternatively, if the response message 45 is not verified, no corresponding message is sent to the computer 20. Further, the security device 23 may issue a warning or alarm that the monitor 21a is not operating correctly. It will be understood that the monitor 21a attempting to send incorrect or inappropriate messages to the computer 20, or sending message spontaneously instead of in response to messages from the computer 20, may be an indication that the monitor 21a is malfunctioning or attempting to subvert control of the computer 20, so that such a warning may allow the computer 20 to be disconnected from the monitor 21a, in order to limit any risk of negative effects. In some examples, the processor 37 of the security device 23 may disconnect communications between the computer 20 and the monitor 21a by stopping applying the corresponding voltage to the hot plug detection connection 34 of the first connector 30, and set the voltage of the hot plug detection connection 34 to a low voltage. The computer 20 will understand this low voltage as indicating that the monitor 21a has been disconnected or switched off, and the computer 20 will stop sending messages to the monitor 20 or anticipating that messages will be received from the monitor 21a, ending communications between the computer 20 and the monitor 21a.

When the computer 20 receives the verified response message 47, the computer 20 can take whatever action is appropriate in the circumstances.

It will be understood that if the message 41 did not require any response, the first method of FIG. 4 will end when the monitor 21a processes 44 the verified message 43.

FIG. 4 shows the first method 40 for only a single message 41 and response message 45. It will be understood that in practice the first method 40 may be repeated a large number of times for different messages 41 and/or response messages 45 during operation of the computer 20 and monitor 21a.

In the first example of the first method of FIG. 4 described above, the verified message 43 is the same as the message 41 and the verified response message 47 is the same as the response message 45. In a second, more complex, example, the security device 23 may modify the verified message 43 and/or the verified response message 47 to be different from the original message 41 and the original response message 45. In some examples, such message modification may be used to make the external device 21 appear to the computer 20 to be different in some way to what it actually is. For example, in the illustrated example of FIGS. 2 and 3, where the external device 21 is a monitor 21a, the security device 23 may modify the response message 45 to produce the verified response message 47 in such a way that the verified response message 47 appears (to the computer 20) to come from a monitor having different display parameters and/or options from the actual monitor 21a. If this is done, it may also be necessary to modify at least some of the messages 41 to be appropriate for the actual monitor 21a, rather than the monitor which appears to be present to the computer 20.

Such modification of the messages may be desirable to limit or control which external device drivers of the computer 20 are used and exposed to communications from the external device 21. For example, if the external device 21 is a monitor 21a able to support both video and audio output, the security device 23 may modify the messages sent from the computer 20 to the monitor 21a and/or the response messages sent from the monitor 21a to the computer 20 to make it appears to the computer 20 that the monitor 21a is a monitor which is only able to support video output, and not audio output. As a result, the audio drivers of the computer 20 will not be used or exposed to response messages originating from the monitor 21a. This ensures that any bugs or errors in the audio drivers which could provide a route for deliberate or accidental interference in correct operation of the computer 20 cannot be accessed. This may be regarded as reducing the possible attack surface presented by the computer 20.

In a further example, if the external device 21 is a monitor 21a able to support different video output modes, such as different resolutions or frames per second, the security device 23 may modify the messages sent from the computer 20 to the monitor 21a and/or the response messages sent from the monitor 21a to the computer 20 to make it appears to the computer 20 that the monitor 21a is a monitor which is only able to support a subset of these video output modes, or even only a single video output mode. As a result, only the video drivers of the computer 20 relevant to the apparently supported video output modes will be used or exposed to response messages originating from the monitor 21a. This may reduce the number of video drivers, each of which may contain bugs or errors in which could provide may be provide a route for deliberate or accidental interference in correct operation of the computer 20, which can be accessed.

Again, this may be regarded as reducing the possible attack surface presented by the computer 20. In some such examples, the security device 23 may make it appear to the computer 20 that the monitor 21a is a monitor which is only able to support video output mode(s) corresponding to drivers which have been more completely tested, or which have a larger history of use, and so are less likely to contain bugs or errors giving rise to vulnerabilities. Without wishing to be bound by theory, bugs and other security vulnerabilities in drivers such as graphics drivers tend to be found in the more complex parts of the drivers. Further, any bugs and security vulnerabilities which do exist are more likely to remain undiscovered in less commonly used parts of the drivers, and are more likely to have been discovered by use and resolved in more commonly used parts of the drivers. Further, it may not be practical to fully test all parts of a complex driver because of the required resources and cost, but it may be practical to fully test some parts of a driver, particularly if the tested parts of the driver are the simpler parts. For example, the DisplayPort Multi-Stream Transport is a complex standard likely to increase the attack surface of the complex drivers able to support it, compared simpler drivers supporting simpler standards, such as DisplayPort Single-Stream Transport.

Figure 5:
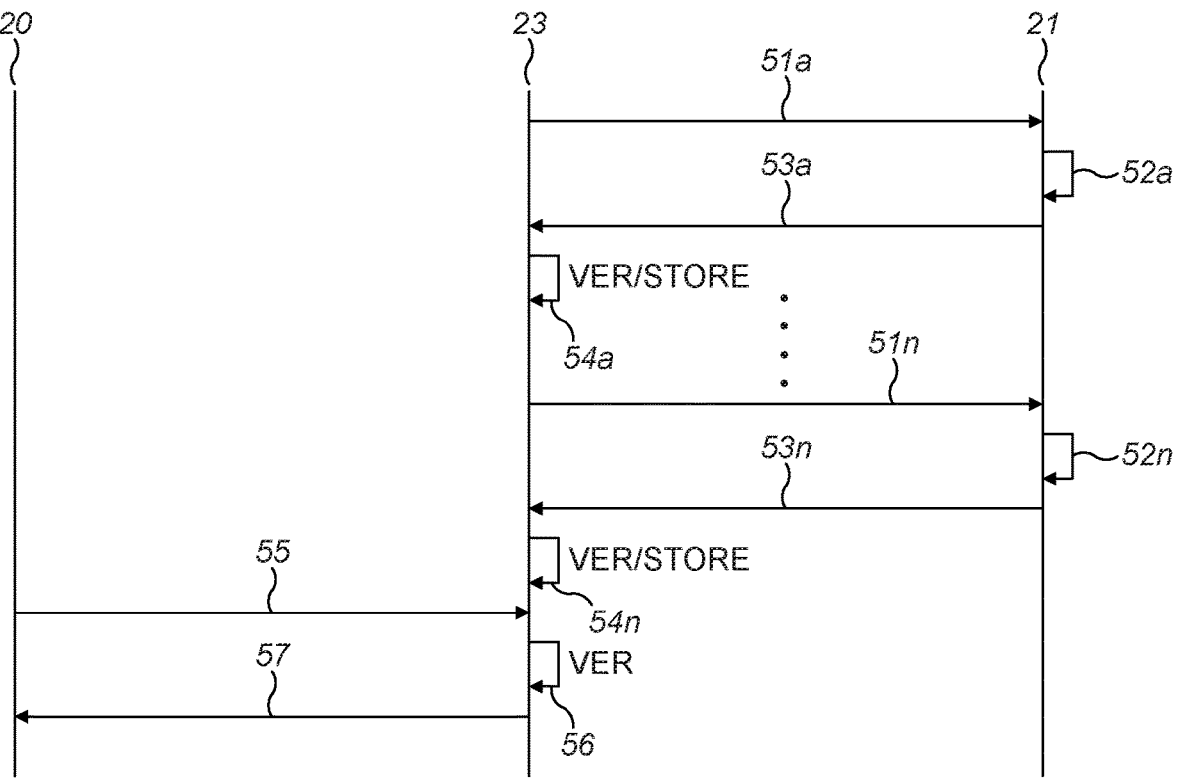
FIG. 5 is a timeline showing a second method of operation of the security device of FIG. 3.

FIG. 5 shows a timeline of a second method 50 of operation of the security device 23.

As shown in FIG. 5, the method 50 begins when processor 37 of the security device 23 uses the second communications module 36 to send a verified message 51a to the monitor 21a along the auxiliary channel 33. Unlike the first method 4 of FIG. 4, in the second method the verified message 51a is generated by the processor 37 of the security device 23, and is not based on a message from the computer 20. The verified message 51a may, for example, be a request for the monitor 21a to provide information. For example, the verified message 51a may request information regarding what display modes the monitor 21a can support.

When the monitor 21a receives the verified message 51a, the monitor 21a processes 52a the verified message 51a, and sends a response message 53a along the auxiliary channel 33. For example, if the verified message 51a was a request for the monitor 21a to provide information the response message 53a may be the requested information. The computer 20 is the intended destination of the response message 53a. However, the response message 53a is received by the security device 23, and is passed by the second communications module 36 to the processor 37.

The processor 37 of the security device 23 verifies 54a that the response message 53a is legitimate. Similarly to the verification of messages in the first method of FIG. 4, in some examples, this may be done by the processor 37 comparing the response message 53a to possible messages which the computer 20 may be expected to receive from the monitor 21a in response to the verified message 51a.

If the response message 53a is verified, the processor 23 stores the data in the response massage 53a in the memory 38. Alternatively, if the response message 53a is not verified, the data in the response message may not be stored. Further, the security device 23 may issue a warning or alarm that the monitor 21a is not operating correctly. It will be understood that the monitor 21a attempting to send incorrect or inappropriate messages to the computer 20 may be an indication that the monitor 21a is malfunctioning or attempting to subvert control of the computer 20, so that such a warning may allow the computer 20 to be disconnected from the monitor 21a, in order to limit any risk of negative effects.

Further verified messages 51*n* may be sent and processed 52*n*, and response messages 53*n* sent, and verified 54*n* and stored, until the security device 23 has stored all required information regarding the monitor 21*a*. This may comprise a large number of verified messages 51 and response messages 53.

In some examples of the second method, the security device 23 may delay applying a voltage to the hot plug detection connection 34 of the first connector 30 to inform the computer 20 that an operating external device is connected the communications port 24 of the computer 20 until after the required information about the monitor 21*a* has been stored.

Subsequently, the computer 20 sends a message 55 along the auxiliary channel 33. The external device 21 (in the illustrated example the monitor 21*a*) is the intended destination of the message 55. However, the message 55 is received by the security device 23, and is passed by the first communications module 35 to the processor 37. The message 55 may, for example, be a request for the monitor 21*a* to provide information. For example, the message 41 may request information regarding what display modes the monitor 21*a* can support.

The processor 37 of the security device 23 verifies 56 that the message 55 is legitimate. Similarly to the verification of messages in the first method of FIG. 4, in some examples, this may be done by the processor 37 comparing the message 55 to possible messages which the computer 20 may be expected to send to the monitor 21*a* in operation.

If the message 55 is verified, the processor 37 generates a verified response message 57 based on the information about the monitor 21*a* stored in the memory 38 of the security device 23, and the processor 37 uses the first communications module 35 to forward the verified response message 57 to the computer 20 along the auxiliary channel 33.

Alternatively, if the message 55 is not verified, a verified response message may not be sent. Further, the security device 23 may issue a warning or alarm that the computer 20 is not operating correctly. It will be understood that the computer 20 attempting to send incorrect or inappropriate messages to an external device may be an indication that the computer 20 is malfunctioning, or that control of the computer 20 has been subverted, so that such a warning may allow the computer 20 to be shut down or investigated, in order to limit any negative effects of the malfunction or subversion.

FIG. 5 shows the method 50 for only a single message 55 and verified response message 57. It will be understood that in practice the method 50 may comprise a large number of times for different messages 41 and/or response messages 45 during operation of the computer 20 and monitor 21*a*

In a first example of the second method, the verified response message 57 may accurately correspond to the actual properties of the external device 21/monitor 21*a* reported in the response messages 53. Alternatively, in a second example of the second method, the verified response message 57 may indicate that the external device 21 has different properties, for similar reasons to those explained above for the second example of the first method.

The first and second methods may both be used together as appropriate. It will be understood that in examples where the second method is used by the security device 23 to obtain and store information regarding the external device 21, and to respond to requests for information from the computer 20, it will be necessary to use the first method if the computer 20 sends a message instructing the external device 21 to take action, as such a request will have to be forwarded to the external device.

In the illustrated embodiment, the security device 23 is connected to both a computer 20 and an external device/monitor 21/21*a*. In some examples, the security device 23 can generate and send verified messages to a monitor 21*a* in a similar manner to that illustrated in FIG. 5, without the security device 20 being connected to a computer 20. In such examples, the security device 23 can be used to test the monitor and confirm that it is operating correctly.

In the illustrated embodiment, where the DisplayPort standard is used, the various communications are sent through the auxiliary channel 33. In other examples using different communications standards or formats this may not be the case.

In the illustrated embodiment, the second communications module 36 of the security device 23 is connected to the hot plug detection connection 34 of the second connector 31, so that the computer 20 cannot directly receive the hot plug detection voltage from the external device 21, and instead receives a hot plug detection voltage produced by the first communications module 35 of the security module 23. In alternative examples, the hot plug detection connection 34 may be directly connected between the first connector 30 and the second connector 31 in a similar manner to the main data link 32. In such examples, the security device 23 may detect the voltage on the hot plug detection connection 34 to identify that an operating external device is connected the communications port 26 of the security device 23.

In the illustrated examples, the security device 23 is separate from, and connected to, the computer 20 and the external device 21. In other examples, the security device 23 may be physically integrated into the computer 20. In such examples, the communications port 26 of the security device 23 will be the communications access point of the computer 20 which is accessible for connection to external devices, such as the external device 21, effectively replacing, or take the place of, the communications port 24 of the computer 24 of FIG. 2.

In the illustrated examples, the security device 23 protects only a single connection between the computer 20 and a single external device 21. In other examples, the security device 23 may protect a plurality of connections between the computer 20 and a plurality of external devices 21. In some examples, the security device 23 may be connected to a plurality of different external devices 21 through a splitter, or similar device, so that the security device 23 protects the connection between the computer 20 and all of the plurality of external devices 21. In other examples, the security device may comprise a plurality of communications ports 26, which may be communications ports of the same or different types, and protect connections between the computer 20 and external devices 21 through all of these communications ports 26. In some examples, the security device 23 may be physically integrated into a docking station for a laptop computer and protect some or all connections between the computer 20 and external devices 21 through the docking station.

In the illustrated examples, the security device 23 verifies communications in both directions between the computer 20 and the external device 21. This is not essential. In other examples, only communications from the external device 21 to the computer 20 are verified. In such examples other means may be used to monitor operation of the computer 20 and identify any incorrect operation.

The embodiments described above have the security device 23 associated with a computer 20 and arranged to protect a computer 20 from receiving harmful communications, such as code, from an external device 21. In alternative examples, a security device 23 may be associated with an external device 21 intended to be connected to a computer 20, to protect the external device 21 from receiving harmful communications. This may be useful, for example to protect external devices such as signage and home automation devices, among other applications.

Some of the embodiments described above are used to protect a computer connected to a monitor. The use of the present disclosure is not limited to monitors, and can also be used for other types of external device.

The embodiments described above have a security device 23 with a processor 37. In other examples the processor may comprise multiple processors arranged to provide the described functionality.

The embodiments described above are fully automatic. In some alternative examples a user or operator of the system may manually instruct some steps of the method to be carried out.

The acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is issued for designing silicon chips, or for configuring universal programmable chips, to carry out desired functions.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-ray® disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

Further, to the extent that the term "includes" is used in either the detailed description or the claims, such term is intended to be inclusive in a manner similar to the term "comprising" as "comprising" is interpreted when employed as a transitional word in a claim.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A security method for a computer, the method comprising:
  providing a security device connected to a communication port of the computer and having a separate communication connection to an external device to enable communication over a bidirectional link between the computer and the external device and communication over a unidirectional link from the computer to the external device; and
  at the security device:
    receiving a first message via the bidirectional link having the computer as a first intended destination from the external device;
    verifying the first message; and
    one of:
      if the first message is verified as legitimate, sending a first corresponding message to the computer; or
      if the first message is not verified as legitimate, not sending the first corresponding message to the computer; and
    in response to receiving a second message via the unidirectional link from the computer to the external device, forwarding the second message to the external device without analysis;
    wherein the first corresponding message is modified when sent over the bidirectional link to cause the external device to appear, to the computer, to be an external device having different apparent parameters corresponding to functionality of the external device than actual parameters corresponding to functionality of the external device in a manner limiting exposure of one or more device drivers among a plurality of device drivers of the computer to the external device.

2. The method of claim 1, wherein verifying the first message comprises comparing the first message to possible messages that the external device may send to the computer.

3. The method of claim 1, further comprising, at the security device:
  receiving a third message having the external device as a second intended destination from the computer; and
  sending a second corresponding message to the external device;
  wherein verifying the first message comprises confirming that the third message having the external device as the second intended destination was received from the computer so that the first message having the computer as the first intended destination received from the external device may be a response to the third message having the external device as the second intended destination received from the computer.

4. The method of claim 1, further comprising, at the security device:
  receiving a third message having the external device as a second intended destination from the computer;
  verifying the third message; and
  one of:
    if the third message is verified as legitimate, sending a second corresponding message to the external device; or
    if the third message is not verified as legitimate, not sending the second corresponding message to the external device.

5. The method of claim 4, wherein verifying the third message comprises comparing the third message to possible messages that the computer may send to the external device.

6. The method of claim 1, wherein content for the second message forwarded to the external device is identical to content received for the second message.

7. The method of claim 1, wherein the first corresponding message is modified from the first message with respect to one or more display parameters.

8. A security method for a computer, the method comprising:
  providing a security device connected to a communication port of to the computer and having a separate communication connection to an external device to enable communication between the computer and the external device; and
  at the security device:
    sending one or more request for information messages to the external device regarding operation mode capabilities of the external device;
    receiving a first message among one or more response messages from the external device indicating operation modes supported by the external device, the first message having the computer as a first intended destination from the external device;
    verifying the first message;
    one of:
      if the first message is verified as legitimate, sending a first corresponding message to the computer; or
      if the first message is not verified as legitimate, not sending the first corresponding message to the computer; and
    storing data from the one or more response messages;
    wherein the first corresponding message is modified to cause the external device to appear, to the computer, to be an external device having different apparent parameters corresponding to operation modes supported by the external device than actual parameters corresponding to operation modes supported by the external device in a manner limiting exposure of one or more device drivers among a plurality of device drivers of the computer to the external device.

9. The method of claim 1, wherein the external device is a monitor.

10. A security device comprising:
  a first communications module configured to be connected to a communication port of a computer;
  a second communications module configured to be connected to an external device to enable communication over a bidirectional link between the computer and the external device and communication over a unidirectional link from the computer to the external device; and
  a processor configured to:
    when the second communications module receives a first message via the bidirectional link having the computer as a first intended destination from the external device, verify the first message; and
    one of:
      if the first message is verified as legitimate, send a first corresponding message from the first communications module to the computer; or
      if the first message is not verified as legitimate, not send the first corresponding message to the computer; and
    when the first communications module receives a second message via the unidirectional link from the computer to the external device, forward the second message to the external device without analysis;

wherein the first corresponding message is modified when sent over the bidirectional link to cause the external device to appear, to the computer, to be an external device having different apparent parameters corresponding to functionality of the external device than actual parameters corresponding to functionality of the external device in a manner limiting exposure of one or more device drivers among a plurality of device drivers of the computer to the external device.

11. The security device of claim 10, wherein, to verify the first message, the processor is configured to compare the first message to possible messages that the external device may send to the computer.

12. The security device of claim 10, wherein the processor is further configured to:

receive a third message having the external device as a second intended destination from the computer; and send a second corresponding message to the external device;

wherein, to verify the first message, the processor is configured to confirm that the third message having the external device as the second intended destination was received from the computer so that the first message having the computer as the first intended destination received from the external device may be a response to the third message having the external device as the second intended destination received from the computer.

13. The security device of claim 10, wherein the processor is further configured to:

when the first communications module receives a third message having the external device as a second intended destination from the computer, verify the third message; and one of:

if the third message is verified as legitimate, send a second corresponding message from the second communications module to the external device; or if the third message is not verified as legitimate, not send the second corresponding message to the external device.

14. The security device of claim 13, wherein, to verify the third message, the processor is configured to compare the third message to possible messages that the computer may send to the external device.

15. The security device of claim 10, wherein content for the second message forwarded to the external device is identical to content received for the second message.

16. The security device of claim 10, wherein the first corresponding message is modified from the first message with respect to one or more display parameters.

17. A security device comprising:

a first communications module configured to be connected to a communication port of a computer;

a second communications module configured to be connected to an external device to enable communication over a bidirectional link between the computer and the external device and communication over a unidirectional link from the computer to the external device; and a processor configured to:

send one or more request for information messages via the second communications module to the external device regarding operation mode capabilities of the external device;

when the second communications module receives a first message among one or more response messages from the external device indicating operation modes supported by the external device, the first message having the computer as a first intended destination from the external device, verify the first message;

one of:

if the first message is verified as legitimate, send a first corresponding message from the first communications module to the computer; or if the first message is not verified as legitimate, not send the first corresponding message to the computer; and when the second communications module receives the one or more response messages from the external device, store data from the one or more response messages;

wherein the first corresponding message is modified to cause the external device to appear, to the computer, to be an external device having different apparent parameters corresponding to operation modes supported by the external device than actual parameters corresponding to operation modes supported by the external device in a manner limiting exposure of one or more device drivers among a plurality of device drivers of the computer to the external device.

18. A non-transitory computer-readable medium comprising instructions that, when executed by a processor of a security device, cause the processor to:

receive a message having a computer as an intended destination from an external device via a bidirectional link at a security device connected to a communication port of the computer and having a separate communication connection to the external device to enable communication over the bidirectional link between the computer and the external device and communication over a unidirectional link from the computer to the external device;

verify the message; and one of:

if the message is verified as legitimate, send a corresponding message to the computer; or if the message is not verified as legitimate, not send the corresponding message to the computer; and in response to receiving a second message via the unidirectional link from the computer to the external device, forward the second message to the external device without analysis;

wherein the corresponding message is modified when sent over the bidirectional link to cause the external device to appear, to the computer, to be an external device having different apparent parameters corresponding to functionality of the external device than actual parameters corresponding to functionality of the external device in a manner limiting exposure of one or more device drivers among a plurality of device drivers of the computer to the external device.

* * * * *